United States Patent [19]
Marshall

[11] Patent Number: 5,402,634
[45] Date of Patent: Apr. 4, 1995

[54] FUEL SUPPLY SYSTEM FOR A STAGED COMBUSTOR

[75] Inventor: Richard L. Marshall, Manchester, Conn.

[73] Assignee: United Technologies Corporation, Hartford, Conn.

[21] Appl. No.: 141,319

[22] Filed: Oct. 22, 1993

[51] Int. Cl.[6] .............................................. F02C 7/22
[52] U.S. Cl. ..................... 60/39.06; 60/734; 60/747
[58] Field of Search .............. 60/39.02, 39.06, 39.094, 60/733, 734, 739, 740, 746, 747, 243

[56] References Cited

U.S. PATENT DOCUMENTS

| | | | |
|---|---|---|---|
| 4,265,615 | 5/1981 | Lohmann et al. | 431/353 |
| 4,344,280 | 8/1982 | Minakawa et al. | 60/39.094 |
| 4,411,137 | 10/1983 | Pearce | 60/739 |
| 4,716,719 | 1/1988 | Takahashi et al. | 60/39.06 |
| 4,817,389 | 4/1989 | Holladay et al. | 60/739 |
| 4,890,453 | 1/1990 | Iwai et al. | 60/39.465 |
| 4,903,478 | 2/1990 | Seto et al. | 60/39.281 |
| 4,949,538 | 8/1990 | Iasillo et al. | 60/39.465 |
| 4,964,270 | 10/1990 | Taylor et al. | 60/39.094 |
| 4,993,222 | 2/1991 | Iwai et al. | 60/39.06 |
| 5,003,771 | 4/1991 | Kester et al. | 60/243 |
| 5,036,657 | 8/1991 | Seto et al. | 60/39.281 |
| 5,099,644 | 3/1992 | Sabla et al. | 60/267 |
| 5,121,597 | 6/1992 | Urushidani et al. | 60/39.06 |
| 5,127,221 | 7/1992 | Beebe | 60/39.02 |
| 5,127,229 | 7/1992 | Ishibashi et al. | 60/747 |
| 5,142,858 | 9/1992 | Ciokajlo et al. | 60/39.33 |
| 5,142,871 | 9/1992 | Lampes et al. | 60/756 |
| 5,154,060 | 10/1992 | Walker et al. | 60/746 |
| 5,201,181 | 4/1993 | Ohmori et al. | 60/747 |
| 5,257,502 | 11/1993 | Napoli | 60/739 |
| 5,261,222 | 11/1993 | Napoli | 60/39.06 |
| 5,284,020 | 2/1994 | Brocard et al. | 60/739 |
| 5,289,685 | 3/1994 | Hoffa | 60/739 |
| 5,303,542 | 4/1994 | Hoffa | 60/39.06 |
| 5,321,949 | 6/1994 | Napoli et al. | 60/739 |

OTHER PUBLICATIONS

I. Segalman, R. G. McKinney, G. J. Sturgess and L-M. Huang "Reduction of NOx by Fuel-Staging in Gas Turbine Engines-A commitment to the Future", pp. 29-1-29-17.

K. Aoyama and S. Mandai, "Development of a Dry Low NOx Combustor for a 120-MW Gas Turbine", Oct. 1984, vol. 106, pp. 795-800.

S. J. Markowski, R. P. Lohmann, R. S. Reilly, "The Vorbix Burner-A New Approach to Gas Turbine Combustors", Jan. 1976, pp. 123-129.

Primary Examiner—Louis J. Casaregola

[57] ABSTRACT

A fuel supply system for a gas turbine engine having a multi-stage combustor provides responsiveness by blocking the drainage of fuel within the fuel lines during pilot only operation. In a particular embodiment, the fuel supply system includes a fuel source, a flow splitter valve, a main flow divider valve interconnected with a plurality of main fuel injectors, a pilot flow divider valve interconnected with a plurality of fuel injectors, and check valves disposed in the fuel lines connecting the main flow divider and the main fuel injectors. The check valves block the flow of fuel to the plurality of main fuel injectors during pilot only operation. A method of operating the fuel supply system includes built in hysteresis. The method includes the steps of switching from pilot to staged at a first thrust level $TL_1$, and switching from staged to pilot at a second thrust level $TL_2 < TL_1$.

9 Claims, 4 Drawing Sheets

FUEL SUPPLY SYSTEM FOR A STAGED COMBUSTOR

TECHNICAL FIELD

This invention relates to gas turbine engines, and more particularly to a fuel supply system for a gas turbine engine having a staged combustor.

Although developed in the field of aircraft engines, the invention has application to other fields where gas turbine engines having staged combustors may be used.

BACKGROUND OF THE INVENTION

A typical gas turbine engine includes a compressor section, a combustor and a turbine section. Working fluid flowing through the gas turbine engine is compressed in the compressor section to add energy to the working fluid. Most of the compressed working fluid exits the compressor section and enters the combustor. In the combustor, the working fluid is mixed with a supply of fuel and ignited. The products of combustion are then flowed through the turbine section where energy is extracted from the working fluid. A portion of the extracted energy is transferred back to the compressor section to compress incoming working fluid and the remainder may be used for other functions.

Gas turbine engines are required to function efficiently over a range of operating conditions. For a gas turbine engine used in aircraft applications, low power operation corresponds to idle, high power operation corresponds to take-off and climb, with cruise and approach/descent falling in an intermediate thrust region between low and high power. At low power, fuel/air ratios must be kept relatively rich to avoid blow-out. Blow-out occurs when the fuel/air ratio within the combustor drops below a lean stability limit. As a result of the low combustion temperature and pressure, combustion efficiency is relatively low. At high power, the fuel/air ratio is near stoichiometric to maximize efficiency.

The combustion process generates numerous byproducts such as smoke particulate, unburned hydrocarbons, carbon monoxide, and oxides of nitrogen. At low power, the lower combustion efficiency results in the production of unburned hydrocarbons and carbon monoxide. At high power, the production of oxides of nitrogen increases as the operating temperature and residence time increase. Residence time is defined as the amount of time the combustion mixture remain above a particular temperature. Reducing the operating temperature may reduce the output of the gas turbine engine. Reducing the residence time, may result in less efficient combustion and higher production of carbon monoxide.

For environmental reasons, these byproducts are undesirable. In recent years, much of the research and development related to gas turbine engine combustion has focused on reducing the emission of such byproducts.

A significant development in gas turbine engine combustors has been the introduction of multiple stage combustors. A multiple stage combustor typically includes a pilot stage, a main stage, and possibly one or more intermediate stages. An example of such a combustor is disclosed in U.S. Pat. No. 4,265,615, issued to Lohmann et al and entitled "Fuel Injection System for Low Emission Burners".

At low power only the pilot stage is operated. This permits fuel/air ratios nearer to stoichiometric and the efficiency at idle is thereby increased and the production at idle of unburned hydrocarbons and carbon monoxide is reduced. At high power the pilot stage and one or more of the other stages is operated. Having multiple stages reduces the residence time within each particular stage, relative to a single large combustion chamber. The lower residence time results in lower production of oxides of nitrogen. Having multiple stages also permits the equivalence ratio to be optimized over a range of operating conditions. As a result of having multiple stages rather than a single stage, the emission of unwanted combustion byproducts is reduced and the overall efficiency is improved.

A fuel system for a multiple stage combustor has to be responsive to the operator's demands and provide safe operation throughout the operating range of the gas turbine engine. This is especially true for aircraft applications of gas turbine engines. The gas turbine engine must have high thrust available at all times it may be needed and the switch from low to high thrust needs to be performed quickly and smoothly. For instance, during approach and descent the gas turbine engine is typically operating at an intermediate thrust level, but the combustor must provide the operator with the availability of high thrust upon demand.

In addition to the above considerations, the fuel system should be cost effective and maintainable. Although a highly complex fuel system may provide responsiveness, it may be also be cost prohibitive and increase the downtime of the engine due to increased maintenance. Increased cost and downtime would negate some of the benefits of the multiple stage combustor.

The above art notwithstanding, scientists and engineers under the direction of Applicants' Assignee are working to develop simple, safe and responsive fuels systems for multi-stage combustors.

DISCLOSURE OF THE INVENTION

According to the present invention, a fuel system for a gas turbine engine having a multi-stage combustor includes pilot fuel lines, main fuel lines, and means to block drainage of the main fuel lines during pilot operation of the combustor.

According to a specific embodiment of the present invention, the means to block drainage includes a check valve disposed in the main fuel lines upstream, relative to the direction of fuel flow, of each of a plurality of main fuel nozzles. The main fuel lines interconnect the main fuel nozzles and a main flow divider valve. A plurality of pilot fuel lines interconnect a plurality of pilot fuel nozzles and a pilot flow divider valve. Both divider valves are connected to a splitter means which is itself connected to a fuel metering means. An electronic engine control generates control signals in response to thrust demands by an operator. The electronic engine control includes a stage switching means which switches the combustor from pilot operation to multiple-stage operation at a first thrust level $TL_1$ and switches the combustor from staged operation to pilot operation at a second thrust level $TL_2$, wherein $TL_2 < TL_1$.

A principle feature of the present invention is the means to block drainage of the main fuel lines during pilot operation. A feature of a specific embodiment is the single splitter means, the two flow divider valves, and the check valves disposed in the main fuel lines.

Another feature of the specific embodiment is the switching means within the electronic engine control. A feature of the control method of the present invention is the built in hysteresis which delays the switch from staged to pilot operation until a thrust level below the thrust level for switching from pilot to staged operation.

A primary advantage of the present invention is the responsiveness of the combustor resulting from having means to block drainage of the main fuel lines. Blocking the drainage of the main fuel lines reduces or eliminates the need to pre-fill the main fuel lines prior to switching from pilot to staged operations and thereby the delay associated with the pre-fill. An advantage of the specific embodiment is the simplicity of the fuel system. Only the splitter means is controlled by the electronic engine control. The flow divider valves remain open under all operational conditions and the check valves respond to a pressure differential in the main fuel lines to control opening and closing. This simplicity reduces cost and improves maintainability of the fuel system. Another advantage is the safety of the fuel system as a result of the switching means having built in hysteresis. The hysteresis permits the combustor to remain in staged operation during approach and descent of the aircraft, which are typically low or intermediate power operations, to ensure immediate availability of high power, if needed.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
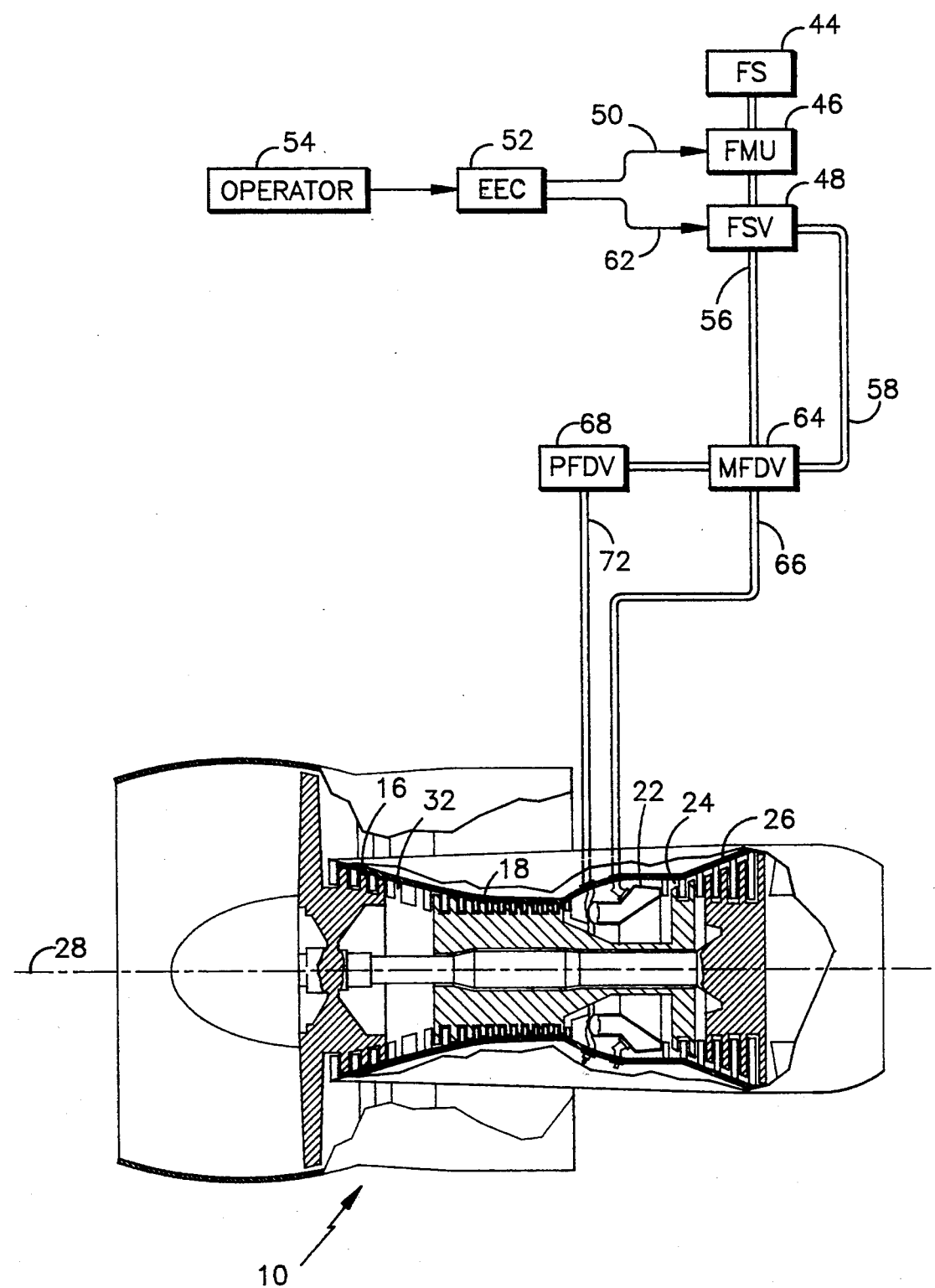
FIG. 1 is a cross-sectional view of a gas turbine engine having a dual stage combustor, including a fuel supply system.

FIG. 1 illustrates a gas turbine engine 10 and includes a schematic drawing of a fuel supply system 14. The gas turbine engine includes a low pressure compressor 16, a high pressure compressor 18, a combustion section 22, a high pressure turbine 24, and a low pressure turbine 26. The gas turbine engine is disposed about a longitudinal axis 28 and includes an annular flowpath 32 disposed about the axis.

Figure 2:
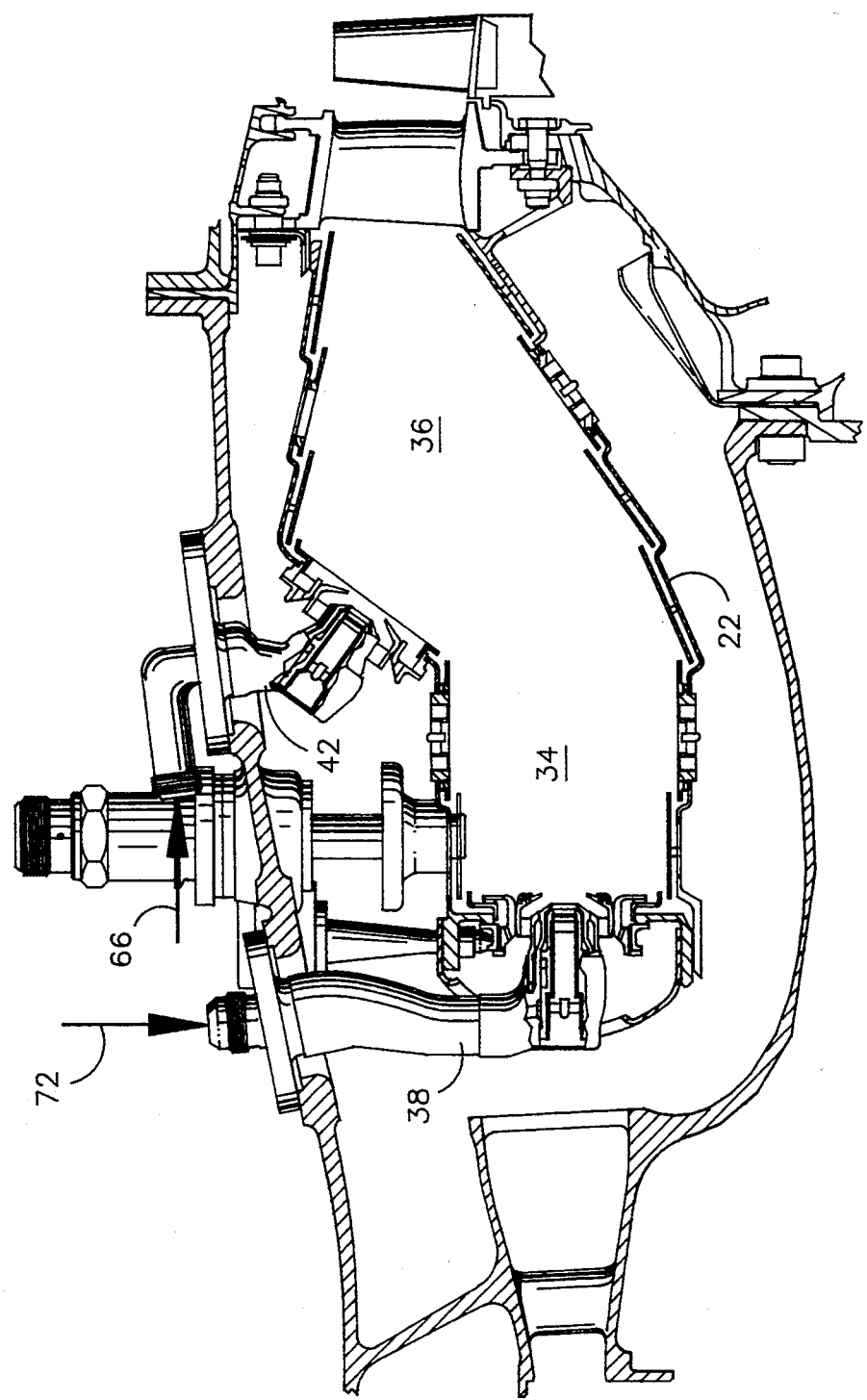
FIG. 2 is a partially sectioned side view of the dual stage combustor.

The combustion section 22 is illustrated in more detail in FIG. 2. The combustion section 22 is a staged combustor and includes a pilot combustion region 34 and a main combustion region 36. Fuel is fed to the pilot combustion region 34 through a plurality of pilot fuel injectors 38 circumferentially spaced about the combustion section 22. Fuel is fed to the main combustion section 36 through a plurality of main fuel injectors 42 circumferentially spaced about the combustor 22 and, in the embodiment illustrated in FIG. 2, axially spaced downstream from the pilot fuel injectors. Although FIG. 2 illustrates a multi-stage combustor having a pilot stage and a main stage spaced circumferentially and axially from the pilot stage, the invention is equally applicable to other multi-stage combustor configurations.

The fuel supply system, as illustrated in FIG. 1, includes a fuel source 44 which is in fluid communication with a fuel metering means 46. The fuel metering means 46 meters the flow to a fuel splitter valve 48 in response to a control signal 50 from a controller 52. The controller 52 is typically an electronic engine control which responds to demands from an operator 54 of the engine. The fuel entering the fuel splitter valve 48 is then proportioned between a main fuel line 56 and a pilot fuel line 58. The ratio of main fuel flow to pilot fuel flow is controlled by the fuel splitter valve 48 in response to a second control signal 62 from the controller 52. Through control signals 50,62 to the fuel metering means 46 and the fuel splitter valve 48, the controller 52 determines the total fuel flow and the ratio of the fuel flow split between the main combustion section 36 and the pilot combustion section 38.

The fuel flowing through the main fuel line 56 flows into a main flow divider valve 64. The main flow divider valve 64 divides the flow of main fuel flow between the plurality of main fuel injectors 42. The flow of fuel from the main flow divider valve 64 is divided substantially equally between a plurality of main fuel injector lines 66 and the main fuel injectors 42. The fuel flowing in the pilot fuel line 58 also passes through the main fuel divider valve 56. Flowing pilot fuel through the main flow divider valve 64 provides means to cool the main flow divider valve 64. Due to the proximity of the main flow divider valve 64 to the engine hot section, overheating of the main flow divider valve 64 is a concern. This is especially true when the gas turbine engine 10 is operating the pilot combustion region 34 only. With the main combustion region 36 not operating, there is no flow of main fuel through the main flow divider valve 64. However, there is static fuel within the main fuel line 56. Overheating of the main flow divider valve 64 may cause coking of the static fuel within it and lead to degradation or inoperability of the main flow divider valve 64. The pilot fuel flowing through the main flow divider valve 64 then flows into a pilot flow divider valve 68. The pilot flow divider valve 68 equally distributes the flow of pilot fuel to the plurality of pilot fuel injectors 38 through a plurality of pilot fuel injector lines 72. Since the pilot combustion region 34 operates during all operating conditions of the gas turbine engine 10, pilot fuel continually flows through the pilot flow divider valve 68 and removes heat from it. Therefore, additional means of cooling to prevent coking within the pilot flow divider valve 68 may not be required.

Figure 3:
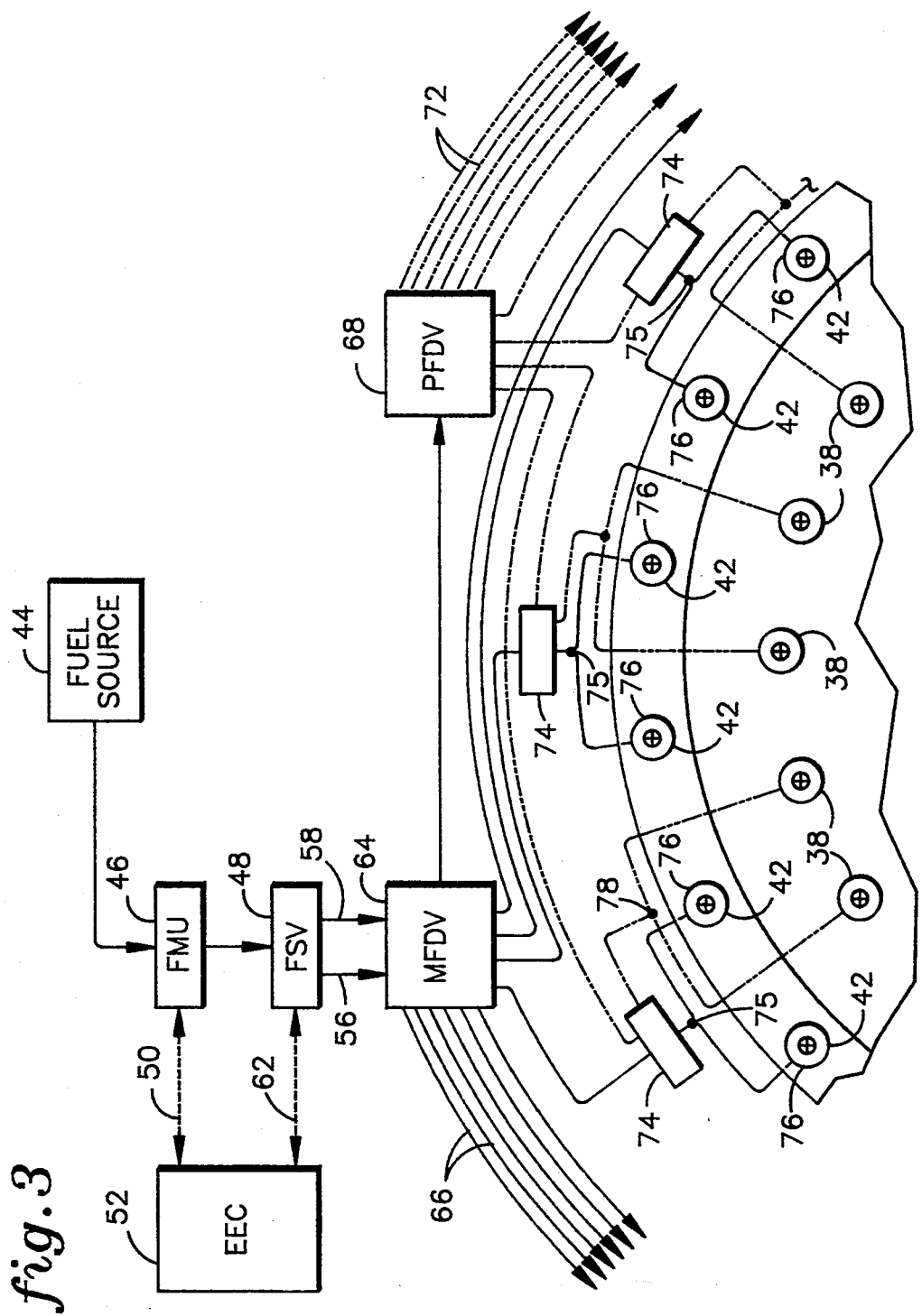
FIG. 3 is a schematic illustration of a fuel system for the dual stage combustor.

Referring now to FIG. 3, fuel exiting the main flow divider valve 64 flows through the plurality of main fuel injector lines 66. Each of the main fuel injector lines 66 carries the main fuel into one of a plurality of check valves 74. From each of the check valves 74, the main fuel flows to a junction 75 that splits the main fuel between a pair of main fuel injectors 42. The check valves 74 provide means to block fuel within the main fuel injector lines 66 from draining during periods of pilot only operation. Each check valve 74 may be a conventional check valve which includes a resilient member, such as a spring, which maintains the check valve in the closed position if the pressure $P_f$ within the main fuel injector line is less than a predetermined value $P_a$. If the pressure $P_f$ exceeds the threshold level $P_a$, the resilient member will yield and the valve will open, permitting flow through the check valve and to the main combustion region. An additional advantage of using a plurality of check valves is that a single check valve having a resilient member with a spring constant K lower than the spring constant $K_p$ associated with the remainder of the plurality of check valves may be used. This will permit one of the pairs of main fuel injectors to ignite prior to the remaining main fuel injectors. This will result in a "soft" ignition of the main combustor.

Pilot fuel exits the pilot fuel divider valve 68 through the plurality of pilot fuel injector lines 72. The pilot fuel flows through one of the main fuel check valves 74 and then to a junction 78. The junction 78 splits the flow of pilot fuel between a pair of pilot fuel injectors 38. Flowing the pilot fuel through the check valves 74 provides means to cool the check valves 74. As with the main fuel divider valves 64 discussed previously, the check valves 74 are proximate to the engine hot section and are at risk for degradation due to fuel coking.

Although shown in FIG. 3 as being paired, it should be obvious to those skilled in the art that both the main fuel injectors and the pilot fuel injectors may be individually connected to one of the fuel injector lines, or may be interconnected in groups of three or more.

During operation of the combustion section 22, the combustor 22 may be operated in a pilot mode or a staged mode. In the pilot mode fuel flows only through the pilot fuel lines 58,72 and combustion occurs in the pilot combustion section 34. This occurs when the control operator 54 demands a thrust level which corresponds to the pilot mode. The controller 52 then sends a control signal 62 to the fuel splitter valve 48 which requests the percentage of pilot fuel flow relative to total fuel flow $W_f$ to be 100% ($W_{f,p}/W_f=1.0$). This corresponds to a condition requiring low power from the gas turbine engine 10, such as during idle operation. For higher power output of the gas turbine engine 10, the combustion section 22 will be switched to the staged mode. In the staged mode, fuel flows to both the pilot combustion section 34 and to the main combustion section 36. This would occur when the operator 54 requests a thrust level above a threshold thrust level $TL_1$ which triggers a control signal 62 from the controller 52 to the flow splitter valve 48 requesting a percentage of pilot fuel flow $W_{f,p}$ to total fuel flow $W_f$ less than 100% ($W_{f,p}/W_f<1.0$).

Figure 5:
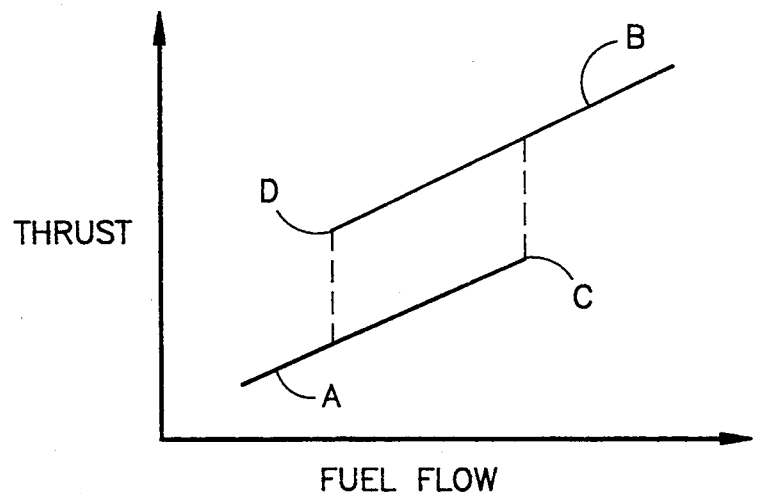
FIG. 5 is a graphic representation of the thrust output of the gas turbine engine as a function of fuel flow $W_f$, to show the hysteresis effect of the fuel system for the staged combustor.

A graphical representation of the control of the pilot versus staged operation of the combustion section is shown in FIG. 5. This figure illustrates the thrust output as a function of the fuel-to-air ratio (F/A) within the combustion section. Lower curve "A" represents the thrust to the fuel-air-ratio curve for the pilot mode. Upper curve "B" represents the thrust to fuel-to-air ratio curve for the staged mode. As shown in FIG. 5, the control system includes a hysteresis affect which is represented by the transition region 82 between the high thrust end of the pilot mode curve A and the low thrust region of the staged mode curve B. The built-in hysteresis maintains the combustion section in the pilot mode until a first thrust level threshold $TL_1$, represented by point "C" in FIG. 5, is reached at which point the combustion section 22 is switched to a staged mode. In addition, the hysteresis maintains the combustion section in a staged mode as thrust is reduced until a second thrust level threshold $TL_2$ represented by point "D" in FIG. 5, is reached. Once the second thrust level threshold $TL_2$ is reached, the combustion section 22 is switched back to a pilot mode. The first thrust level threshold $TL_1$ is at a higher fuel-to-air ratio than the second thrust level threshold $TL_2$.

For aircraft applications, the built-in hysteresis insures that the gas turbine engine 10 remains in a staged mode during both high power operations, such as take-off, and medium to low power operations, such as approach. In effect, for all engine conditions corresponding to flight conditions, the combustor 22 may remain in the staged mode to provide responsive acceleration. Further, for all engine conditions corresponding to on-the-ground conditions (idle and taxi), the combustor will remain in pilot mode to reduce emissions. Maintaining staged operations during approach provides the capability to transition the gas turbine engine to high power as needed.

Figure 4:
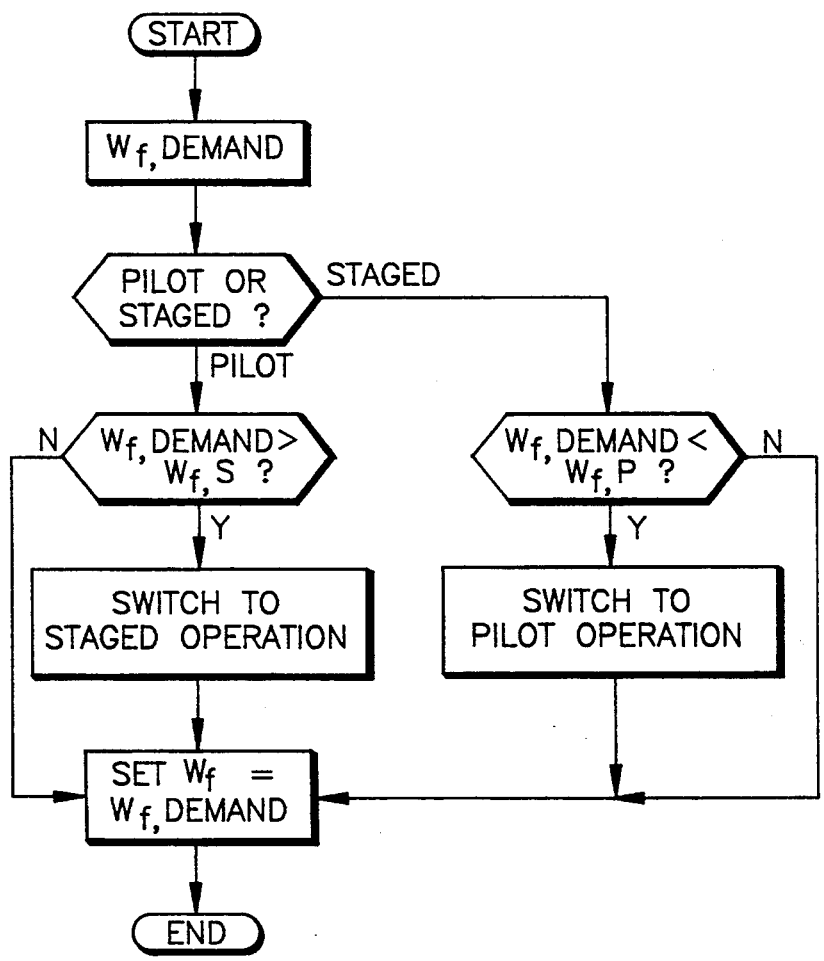
FIG. 4 is a block diagram illustrating the logic of the switching means.

Referring now to FIG. 4, a functional block diagram illustrates the control logic behind the control system. Each block represents either a command or a decision to be made. The first step is the fuel flow demand $W_{f,DEMAND}$, which corresponds to the operator's demand for a specific thrust level. The next step is to determine if the current status of the combustor is pilot mode or staged mode.

If the combustor is in the pilot mode, the next step is to determine if the $W_{f,DEMAND}$ is greater than the fuel flow that corresponds to the first thrust level threshold $TL_1$ for switching from pilot to staged. If it is, the combustor is switched to staged operation and the fuel flow $W_f$ is set to $W_{f,DEMAND}$ and split between the two combustion regions. If not, then the combustor remains in pilot only operation, all the fuel is sent to the pilot region and $W_f$ is set equal to $W_{f,DEMAND}$.

If the combustor is in the staged mode, the next step is to determine if $W_{f,DEMAND}$ is less than the second thrust level threshold $TL_2$ for switching from staged back to pilot. If it is, the combustor is switched to pilot only operation, all the fuel is sent to the pilot region, and $W_f$ is set equal to $W_{f,DEMAND}$. If not, the combustor remains in the staged mode and $W_f$ is set equal to $W_{f,DEMAND}$.

Although the invention has been shown and described with respect to exemplary embodiments thereof, it should be understood by those skilled in the art that various changes, omissions, and additions may be made thereto, without departing from the spirit and scope of the invention.

What is claimed is:

1. A fuel supply system for a gas turbine engine having a multi-stage combustor, the combustor including a pilot stage and a main stage, the combustor having a pilot operation characterized by combustion occurring in the pilot stage only and a staged operation characterized by combustion occurring in both the pilot stage and the main stage, the fuel supply system including:

means to generate control signals in response to thrust demands, the control signal including fuel flow requests and operation requests;

a fuel metering means in fluid communication with a source of fuel, the fuel metering means adapted to meter the fuel flow $W_f$ from a source of fuel in response to a fuel flow request;

splitter means including an fuel inlet, a pilot outlet, and a main outlet, the fuel inlet in fluid communication with the fuel metering means, the pilot outlet directing a pilot fuel flow $W_{f,p}$ to the pilot stage via a pilot fuel line, $W_{f,p}$ corresponding to at least a portion of the fuel entering the fuel inlet, the main outlet directing the remainder of the fuel flow $W_{f,m}$ to the main stage via a main fuel line, wherein the splitter means varies a ratio $W_{f,p}/W_f$ in response to the operation request from the engine controller, the splitter means having a first operational condition characterized by $W_{f,p}/W_f = 1.0$ and corresponding to pilot operation, and a second operational condition characterized by $W_{f,p}/W_f < 1.0$ and corresponding to staged operation;

a pilot flow divider means including a fuel inlet and a plurality of fuel outlets, the fuel inlet being in fluid communication with the pilot fuel outlet;

a main flow divider means including a fuel inlet and a plurality of fuel outlets, the fuel inlet being in fluid communication with the main fuel outlet;

a plurality of pilot fuel nozzles, each of the pilot fuel nozzles in fluid communication with one of the pilot flow divider means outlets via a plurality of pilot nozzle lines;

a plurality of main fuel nozzles, each of the main fuel nozzles in fluid communication with one of the main flow divider means outlets via a plurality of main nozzle lines; and means to block fuel within the main fuel line and main nozzle lines from draining during pilot operation.

2. The fuel supply system according to claim 1, wherein the control signal generating means includes switching means, wherein the switching means switches the combustor from pilot operation to staged operation at a first thrust level $TL_1$, the fuel system switches from staged operation to pilot operation at a second thrust level $TL_2$, wherein $TL_2 < TL_1$.

3. The fuel supply system according to claim 1, wherein the means to block draining includes a plurality of check valves, each check valve disposed along one of the plurality of main fuel lines, each check valve downstream of one of the main flow divider valve outlets and upstream of the corresponding main fuel nozzle, the check valves having an open position permitting flow through the valve and a closed position blocking flow through the valve, the valve adapted to close if fuel pressure $P_f$ upstream of the check valves is less than a predetermined value $P_a$, wherein $P_f < P_a$ with the splitter means in the first operational condition and $P_f > P_a$ with the splitter means in the second operational condition such that fuel is maintained within the fuel lines between the check valves and main flow divider valve outlet during pilot only operation.

4. The fuel supply system according to claim 2, wherein the means to block draining includes a plurality of check valves, each check valve disposed along one of the plurality of main fuel lines, each check valve downstream of one of the main flow divider valve outlets and upstream of the corresponding main fuel nozzle, the check valves having an open position permitting flow through the valve and a closed position blocking flow through the valve, the valve adapted to close if fuel pressure $P_f$ upstream of the check valves is less than a predetermined value $P_a$, wherein $P_f < P_a$ with the splitter means in the first operational condition and $P_f > P_a$ with the splitter means in the second operational condition such that fuel is maintained within the fuel lines between the check valves and main flow divider valve outlet during pilot only operation.

5. A fuel supply system for a gas turbine engine having a multi-stage combustor, the combustor including a pilot stage and a main stage, the combustor having a pilot operation characterized by combustion occurring in the pilot stage only and a staged operation characterized by combustion occurring in both the pilot stage and the main stage, the fuel supply system including means to generate control signals in response to thrust demands, wherein the control signal generating means includes switching means, wherein the switching means switches the combustor from pilot operation to staged operation at a first thrust level $TL_1$, the fuel system switches from staged operation to pilot operation at a second thrust level $TL_2$, and wherein $TL_2 < TL_1$.

6. A method of controlling the operation of a multi-stage combustor of a gas turbine engine, the combustor having a main stage and a pilot stage, the gas turbine engine including a fuel supply system and control means for switching the combustor between pilot operation and staged operation, the method including the steps of:

switching the combustor from pilot operation to staged operation at a first thrust level $TL_1$; and switching the combustor from staged operation to pilot operation at a second thrust level $TL_2$, wherein $TL_2 < TL_1$.

7. The method according to claim 6, wherein the fuel supply system includes main fuel lines which provide means to supply fuel to the main stage, and further including a step of blocking fuel within the main fuel lines from draining during pilot operation.

8. The fuel system according to claim 3, wherein each of the check valves includes a resilient member adapted to maintain the check valve in the closed position until $P_f > P_a$, and wherein the plurality of check valves includes at least one check valve having a resilient member with a spring constant k, which is lower than the spring constant $k_p$ associated with the remainder of the plurality of check valves, wherein at least one check valve opens prior to opening of the remainder of check valves.

9. The fuel system according to claim 4, wherein each of the check valves includes a resilient member adapted to maintain the check valve in the closed position until $P_f > P_a$, and wherein the plurality of check valves includes at least one check valve having a resilient member with a spring constant k, which is lower than the spring constant $k_p$ associated with the remainder of the plurality of check valves, wherein at least one check valve opens prior to opening of the remainder of check valves.

* * * * *